Oct. 14, 1924.　　　　　　　　　　1,511,938
T. J. BOTEN
BINDER TRACTOR HITCH
Filed Aug. 3, 1922

Inventor
T. J. Boten
By Johnston Laugh & Co
Attorney

Patented Oct. 14, 1924.

1,511,938

UNITED STATES PATENT OFFICE.

THOMAS J. BOTEN, OF LEES SUMMIT, MISSOURI.

BINDER TRACTOR HITCH.

Application filed August 3, 1922. Serial No. 579,438.

*To all whom it may concern:*

Be it known that THOMAS JAMES BOTEN, a citizen of the United States, residing at Lees Summit, county of Jackson, State of Missouri, has invented certain new and useful Improvements in Binder Tractor Hitches, of which the following is a specification.

My invention relates to improved means for coupling farm or other trailing implements to a tractor to be drawn thereby and it consists essentially in the provision of a wheeled truck having a forwardly projecting tongue for attachment to a tractor and a rearwardly projecting tongue for attachment to a trailer, the latter tongue being composed of sections jointed to afford the necessary play between the truck and the trailer when passing over rough ground or ditches.

In the accompanying drawings:—

Figure 1:
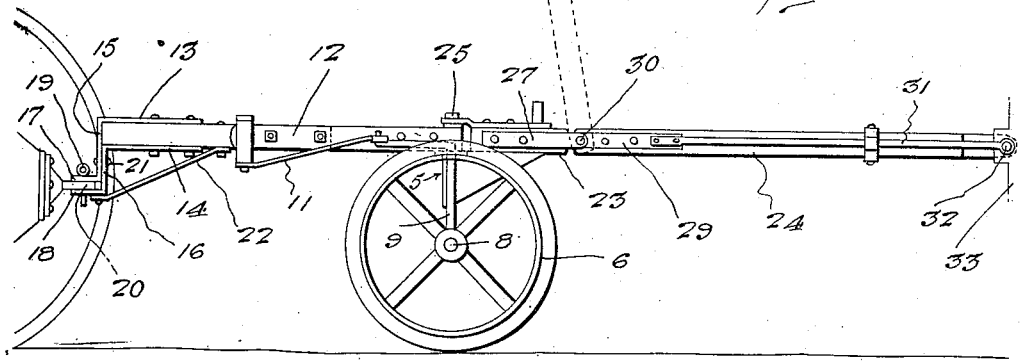
Figure 1 represents a side view of my invention as it will appear when connected between a tractor and a trailer.
Figure 2:
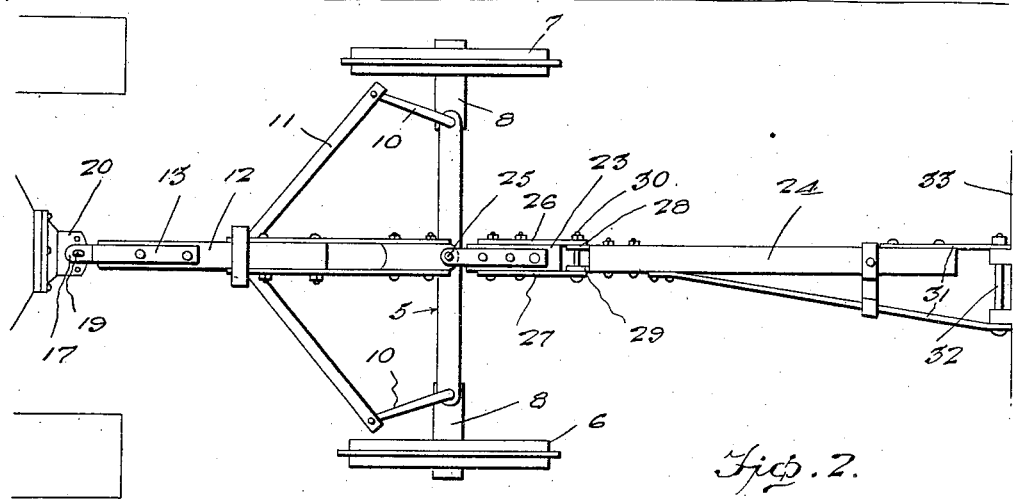
Figure 2 is a plan view of the structure disclosed in Figure 1.
Figure 3:
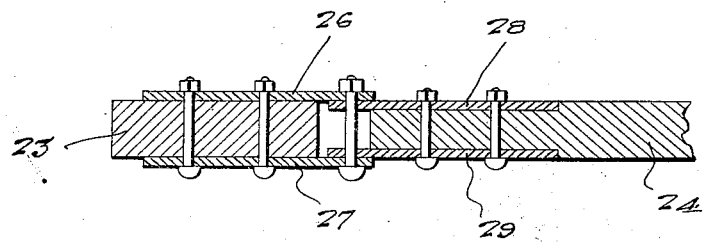
Figure 3 is a detailed sectional view of the joint connecting the sections of the rearwardly projecting tongue.

Referring more particularly to the drawings, 5 designates generally a truck embodying a suitable frame to which a pair of supporting and steering wheels, 6 and 7, are connected through the medium of stub axles 8. The turning of the axles 8 for steering purposes is controlled by means of a pair of vertical shafts 9, secured at their lower ends to the said axles and provided at the opposite ends with crank arms 10. These crank arms are connected by links 11 to a forwardly projecting tongue 12, the rear end of which tongue is secured in a suitable manner to the body of the truck.

At its forward end the said tongue 12 is provided with suitable means for attaching it to a tractor. In the present instance, this attaching means comprises plates 13 and 14 secured respectively to the upper and lower surfaces of the tongue, with the forward ends of the plates bent downwardly as at 15 and 16, and then outwardly to provide the spaced upper and lower securing members 17 and 18, which are apertured for the passage of a coupling pin 19, which pin also passes through a draw bar or projection 20 on the tractor received between the members 17 and 18, preferably the downwardly extending portions 15 and 16 of the plates 14 and 15 are in contact with one another and riveted together as indicated at 21. It is also preferable to provide a brace member 22 attached at one end to the tongue 12 and at the opposite end to the outwardly extending portion 18 of the plate 13.

For the purpose of coupling the trailer vehicle or implement to the truck, I provide the latter with a rearwardly extending tongue comprising a stub section 23 and a main section 24. The stub section 23 is pivoted at one end to the truck 5 as indicated at 25, so as to be capable of a swinging movement in a horizontal direction. Plates 26 and 27 secured to opposite sides of the stub section 23, project beyond the free end of the latter to receive therebetween the projecting ends of a pair of similar plates 28 and 29 secured to opposite sides of the main section 24, the overlapping or projecting ends of the two sets of plates being secured together by a pivot 30 arranged to permit vertical movement of the main section 24 with respect to the stub section 23.

The main section 24 is further provided with a pair of complementary coupling bars 31 adapted to be secured by a bolt 32 to a stub part of trailing implement or vehicle designated at 33.

From the foregoing, it will be apparent that I have provided an improved form of tractor hitch or coupling which will enable the trailing implement or vehicle to move laterally and vertically relatively to the tractor so as to avoid the usual breakage of parts which frequently occurs in vehicle trains owing to the fact that the trailers are not permitted to have the requisite movement relative to the tractor when passing over rough or uneven ground.

Having thus fully described my invention, it is to be understood that I do not limit myself to the exact construction and arrangement of parts disclosed, but reserve the right to resort to such modifications as may later prove desirable providing, of course, that the latter do not depart from the spirit and scope of the invention as defined in the appended claims.

What I claim is:

1. A device of the character described comprising a wheeled truck, a tongue extending forwardly from the truck for attachment to a tractor, a tongue extending rearwardly from the truck for attachment to a trailer, said last mentioned tongue comprising a stub section pivoted at one end to the truck for swinging movement in a horizontal plane, plates carried by the stub section and projecting beyond the free end thereof, a main section, complementary plates carried by the main section and projecting beyond the rear end thereof, and a pivot connecting the projecting ends of the plates of the two sections together, arranged to permit swinging movement of the main section in a vertical plane.

2. A device of the character described, comprising a wheeled truck, a tongue projecting forwardly from the truck, attaching plates secured to the upper and lower surfaces of said tongue at the forward end thereof, the forward ends of said plates being bent downwardly at right angles to the tongue and then bent outwardly below the tongue, the outwardly extending portions of the plates being spaced apart and apertured for the passage of a coupling pin therethrough, and a second jointed tongue projecting rearwardly from the truck, the jointed sections of which are movable in vertical and horizontal planes.

3. A truck for connecting a trailing vehicle to a tractor comprising a wheeled frame, a tongue projecting forwardly from the frame and pivoted thereto for swinging movement in a horizontal plane, a pair of coupling jaws at the forward end of said tongue provided with aligned openings adapted to receive the shank of a coupling pin therethrough and a rearwardly projecting tongue comprising a stub section pivoted to the frame by the same pivot connecting the forwardly projecting tongue thereto and a main section pivoted to said stub section by means of a horizontal pivot permitting vertical movement of the main section relatively to the stub section and coupling means carried by the free end of said main section for connecting same to a trailing vehicle.

In testimony whereof I hereunto affix my signature.

T. J. BOTEN.